United States Patent
Uchiyama

(10) Patent No.: US 12,120,456 B2
(45) Date of Patent: Oct. 15, 2024

(54) IMAGE TRANSMISSION SYSTEM, IMAGE RECEIVING DEVICE, AND CONTROL METHOD FOR IMAGE RECEIVING DEVICE

(71) Applicant: SEIKO EPSON CORPORATION, Tokyo (JP)

(72) Inventor: Yoshiteru Uchiyama, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/331,689

(22) Filed: May 27, 2021

(65) Prior Publication Data

US 2021/0377489 A1 Dec. 2, 2021

(30) Foreign Application Priority Data

May 27, 2020 (JP) .................. 2020-092015

(51) Int. Cl.
| | |
|---|---|
| *H04N 5/63* | (2006.01) |
| *H04N 7/10* | (2006.01) |
| *H04N 7/18* | (2006.01) |
| *H04Q 9/02* | (2006.01) |
| *H04N 7/015* | (2006.01) |

(52) U.S. Cl.
CPC ............. *H04N 7/104* (2013.01); *H04N 5/63* (2013.01); *H04N 7/181* (2013.01); *H04Q 9/02* (2013.01); *H04N 7/015* (2013.01); *H04Q 2209/40* (2013.01)

(58) Field of Classification Search
CPC ........... H04N 7/104; H04N 5/63; H04N 7/18; H04N 7/181; H04N 7/015; H04N 21/41; H04Q 9/01; H04Q 2209/40

USPC .......................................... 348/730, 723, 725
See application file for complete search history.

(56) References Cited

U.S. PATENT DOCUMENTS

| | | | | |
|---|---|---|---|---|
| 8,578,429 | B2* | 11/2013 | Lim ................... | H04N 21/4126 |
| | | | | 725/90 |
| 9,106,950 | B2* | 8/2015 | Howarter ........... | H04N 21/4402 |
| 9,252,847 | B2* | 2/2016 | Baba .................... | H04B 5/0056 |
| 9,942,507 | B2* | 4/2018 | Jung ................ | H04N 21/41265 |
| 10,827,212 | B2* | 11/2020 | Lin ..................... | H04N 21/4516 |
| 11,170,277 | B2* | 11/2021 | Kim ................... | G06K 19/0614 |
| 11,482,095 | B2* | 10/2022 | Wang ..................... | G08C 17/02 |
| 2010/0035547 | A1 | 2/2010 | Miyauchi et al. | |

FOREIGN PATENT DOCUMENTS

| | | |
|---|---|---|
| JP | 2008-90561 A | 4/2008 |
| JP | 2008-165007 A | 7/2008 |
| JP | 2010-041613 A | 2/2010 |

(Continued)

*Primary Examiner* — Trang U Tran
(74) *Attorney, Agent, or Firm* — Dority & Manning, P.A.

(57) ABSTRACT

An image transmission system includes an image transmitting device coupled to a computer, and an image receiving device coupled to a projector, and transmits image information from the image transmitting device to the image receiving device via wireless communication. The image receiving device detects a state of the wireless communication by the image transmitting device, outputs a first control signal turning on a power of the projector to the projector when detecting that the wireless communication is started, receives the image information transmitted from the image transmitting device, and outputs the received image information to the projector.

8 Claims, 8 Drawing Sheets

(56) References Cited

FOREIGN PATENT DOCUMENTS

| JP | 2010-152775 A | 7/2010 |
| JP | 2010-226483 A | 10/2010 |
| JP | 2013-236230 A | 11/2013 |

* cited by examiner

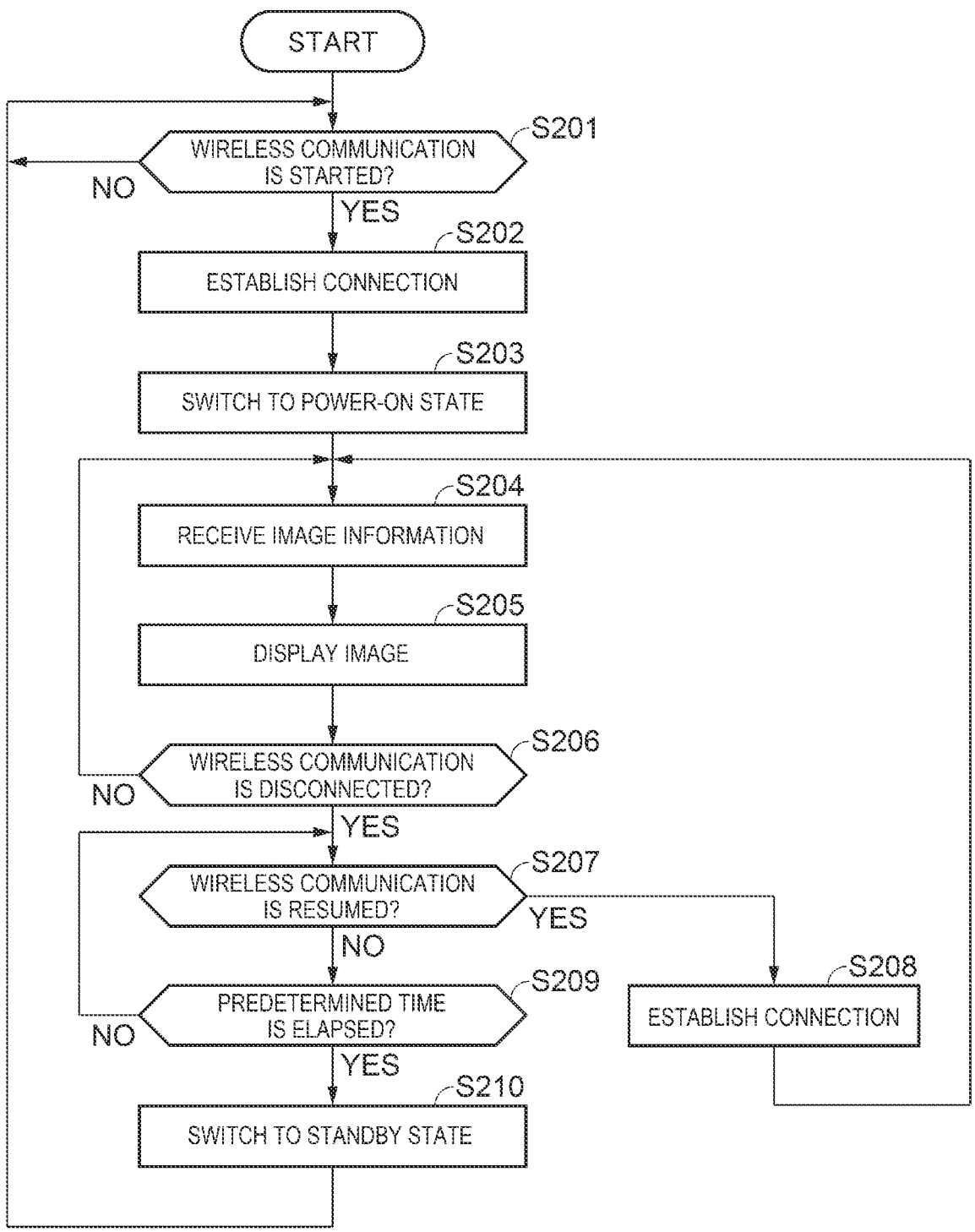

IMAGE TRANSMISSION SYSTEM, IMAGE RECEIVING DEVICE, AND CONTROL METHOD FOR IMAGE RECEIVING DEVICE

The present application is based on, and claims priority from JP Application Serial Number 2020-092015, filed May 27, 2020, the disclosure of which is hereby incorporated by reference herein in its entirety.

BACKGROUND

1. Technical Field

The present disclosure relates to an image transmission system, an image receiving device, and a control method for an image receiving device.

2. Related Art

JP-A-2008-90561 discloses a system in which image information is transmitted from a computer to an image projection device via a wireless device coupled to the computer, thus causing the image projection device to display an image. Such a system improves the convenience of the user because there is no need to couple the computer and the image projection device together via a wire.

However, when actually transmitting image information from the computer to the image projection device and causing the image projection device to project an image, the user or the like operating the computer must move to the position of the image projection device or go to get a remote controller for operating the image projection device in order to turn on the power of the image projection device. Thus, further improvement in convenience is demanded.

SUMMARY

An image transmission system includes an image transmitting device coupled to an image supply device, and an image receiving device coupled to an image display device. The image transmission system is configured to transmit image information from the image transmitting device to the image receiving device via wireless communication. The image transmitting device includes: a coupling unit coupled to the image supply device; and a first wireless communication unit starting the wireless communication when the coupling unit is coupled to the image supply device, and transmitting the image information supplied from the image supply device via the coupling unit, to the image receiving device. The image receiving device includes: a second wireless communication unit receiving the image information transmitted from the image transmitting device; a first output unit outputting the image information received by the second wireless communication unit to the image display device; a second output unit outputting a control signal controlling a power of the image display device to the image display device; and a control unit detecting a state of the wireless communication by the image transmitting device. The control unit outputs a first control signal turning on the power of the image display device from the second output unit to the image display device, when detecting that the wireless communication is started.

An image transmission system includes an image transmitting device coupled to an image supply device, and an image display device displaying an image. The image transmission system is configured to transmit image information from the image transmitting device to the image display device via wireless communication. The image transmitting device includes: a coupling unit coupled to the image supply device; and a first wireless communication unit starting the wireless communication when the coupling unit is coupled to the image supply device, and transmitting the image information supplied from the image supply device via the coupling unit, to the image display device. The image display device includes: a second wireless communication unit receiving the image information transmitted from the image transmitting device; a display unit displaying the image based on the image information received by the second wireless communication unit; and a control unit detecting a state of the wireless communication by the image transmitting device. The image display device is configured to switch between a first state where a power is on and a second state where the power is off except for a portion including the second wireless communication unit. The control unit switches the image display device into the first state when detecting that the wireless communication is started where the image display device is in the second state.

An image receiving device receives image information from an image transmitting device starting wireless communication when coupled to an image supply device and which outputs the image information to an image display device. The image receiving device includes: a wireless communication unit receiving the image information transmitted from the image transmitting device; a first output unit outputting the image information received by the wireless communication unit to the image display device; a second output unit outputting a control signal controlling a power of the image display device to the image display device; and a control unit detecting a state of the wireless communication by the image transmitting device. The control unit outputs a first control signal turning on the power of the image display device from the second output unit to the image display device, when detecting that the wireless communication is started.

A control method for an image receiving device which receives image information from an image transmitting device starting wireless communication when coupled to an image supply device and which outputs the image information to an image display device includes: detecting a state of the wireless communication by the image transmitting device; outputting a first control signal turning on a power of the image display device to the image display device, when detecting that the wireless communication is started; receiving the image information transmitted from the image transmitting device; and outputting the received image information to the image display device.

BRIEF DESCRIPTION OF THE DRAWINGS

FIG. 8 is a flowchart for explaining an operation of the projector.

DESCRIPTION OF EXEMPLARY EMBODIMENTS

First Embodiment

An image transmission system 100 according to this embodiment will now be described with reference to the drawings.

Figure 1:
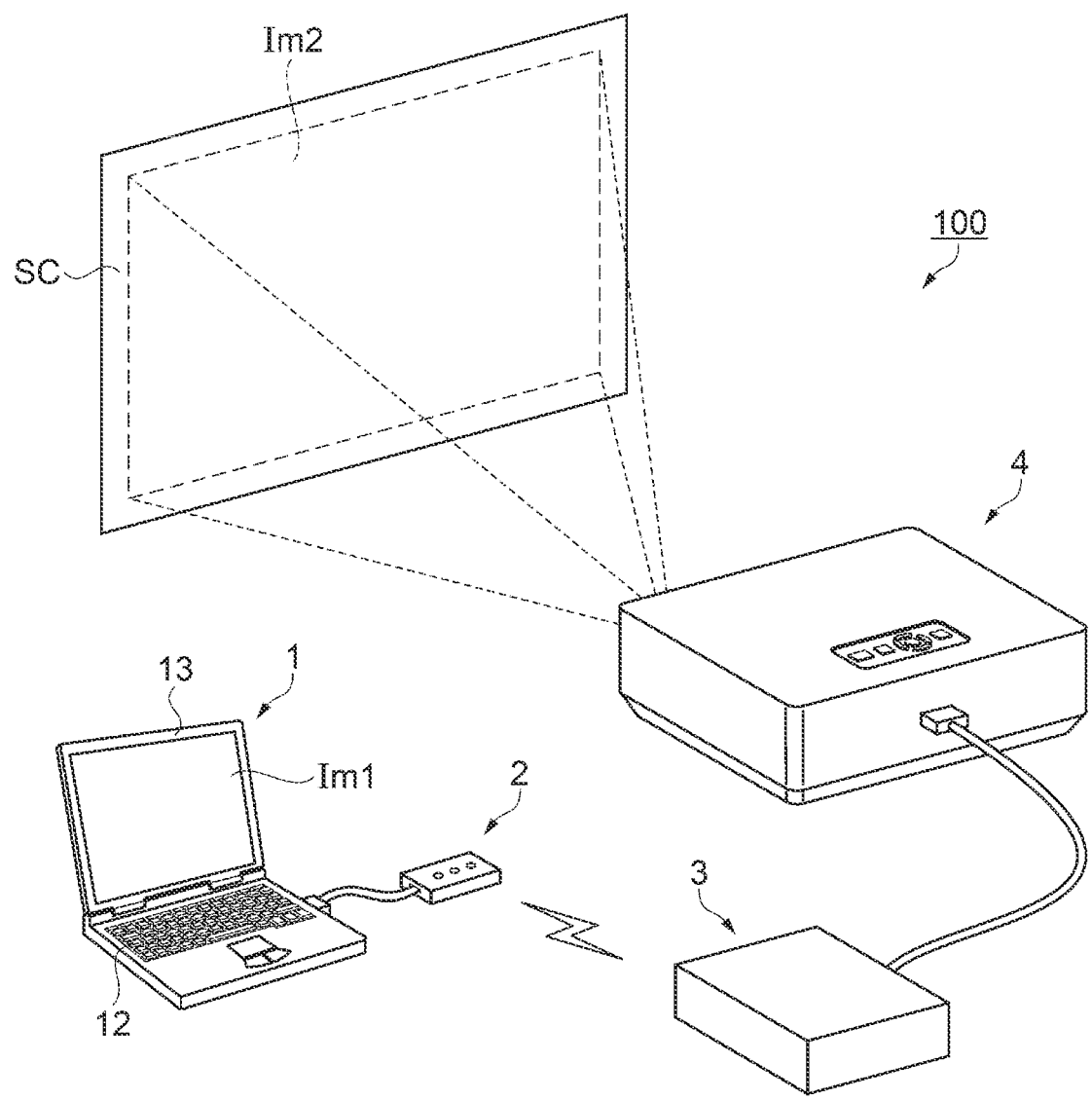
FIG. 1 is an explanatory view showing an image display system according to a first embodiment.

FIG. 1 is an explanatory view showing the image transmission system 100.

As shown in FIG. 1, the image transmission system 100 has a computer 1 as an image supply device, an image transmitting device 2, an image receiving device 3, and a projector 4 as an image display device. The computer 1 is, for example, a laptop personal computer and has an input operation unit 12 such as a keyboard and a display unit 13 displaying an image that are provided in an integrated form. The image transmitting device 2 is configured to be able to be coupled to the computer 1 and wirelessly transmits image information of a display image Im1 displayed on the display unit 13 of the computer 1 to the image receiving device 3. The image receiving device 3 is coupled to the projector 4. The image receiving device 3 receives the image information transmitted from the image transmitting device 2 and outputs the image information to the projector 4. The projector 4 receives the image information supplied from the image receiving device 3 and projects a display image Im2 corresponding to the image information, that is, a display image Im2 of the same content as the display image Im1, onto a projection surface SC such as a screen or wall surface. The image transmitting device 2 and the image receiving device 3 are connected together via a wireless LAN (local area network).

Figure 2:
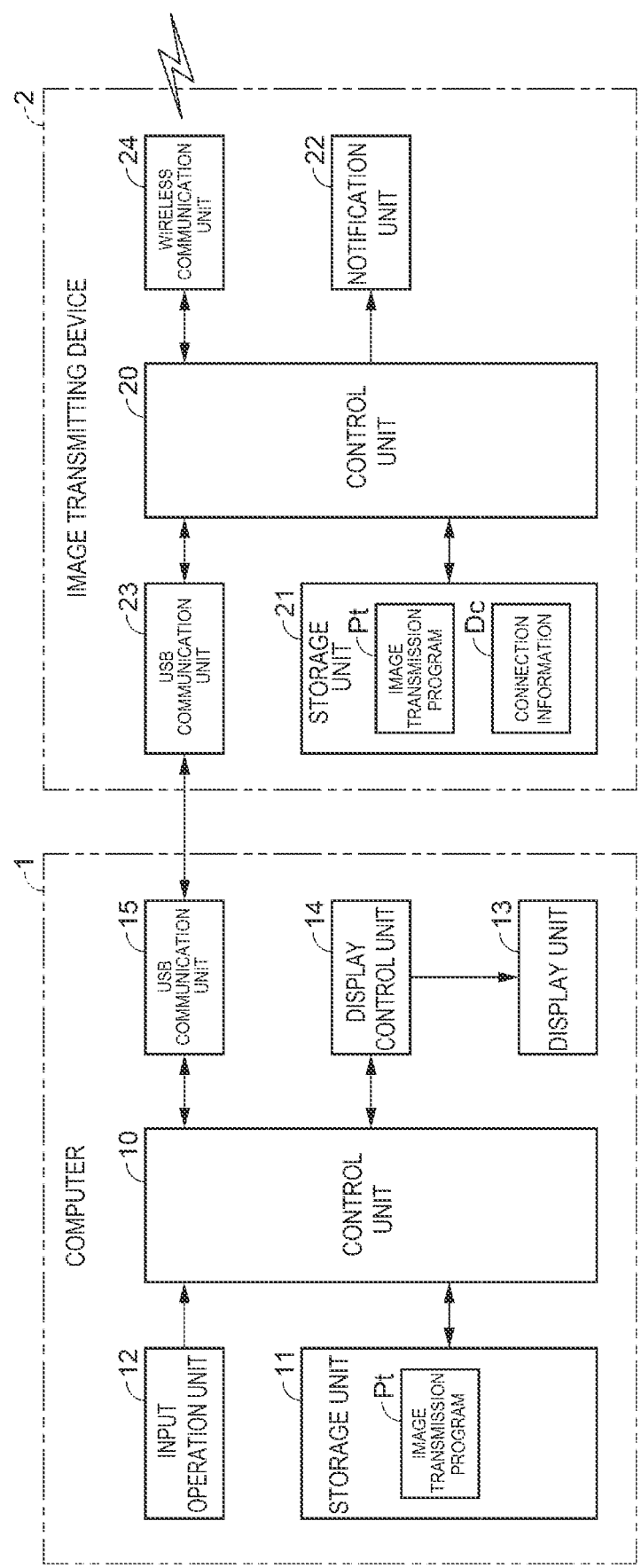
FIG. 2 is a block diagram showing a schematic configuration of a computer and an image transmitting device.

FIG. 2 is a block diagram showing a schematic configuration of the computer 1 and the image transmitting device 2.

As shown in FIG. 2, the computer 1 includes a control unit 10, a storage unit 11, the input operation unit 12, the display unit 13, a display control unit 14, and a USB (universal serial bus) communication unit 15.

The control unit 10 includes one or a plurality of processors, a RAM (random-access memory), and a ROM (read-only memory) or the like. The control unit 10 operates according to a program stored in the ROM or a program read out from the storage unit 11 or an external storage device or the like into the RAM and thus controls operations of the computer 1.

The storage unit 11 has a storage device such as a hard disk drive or solid-state drive. The storage unit 11 stores an OS (operating system) that is installed, an application program, and various data or the like. An image transmission program Pt is stored in the storage unit 11 in this embodiment. The image transmission program Pt is an application program for transmitting image information from the computer 1 to outside via the image transmitting device 2.

The input operation unit 12 includes a keyboard accepting an input of a letter, control code or the like based on a key operation, a pointing device, and the like. The input operation unit 12 transmits an operation signal based on an operation carried out by the user, to the control unit 10.

The display unit 13 has a display device such as a liquid crystal display or organic EL (electroluminescence) display and displays an image based on image information.

The display control unit 14 is formed of one or a plurality of processors, and under the control of the control unit 10, controls the display of an image by the display unit 13. The display control unit 14 is coupled to a VRAM (video RAM), not illustrated. The display control unit 14, under the control of the control unit 10, stores image information corresponding to the OS, application program, various data and the like into the VRAM and thus causes the display unit 13 to display an image based on the image information. The display control unit 14 may be formed of a dedicated processing device such as an ASIC (application-specific integrated circuit) or FFGA (field-programmable gate array).

The USB communication unit 15 is coupled to an external peripheral device via a USB terminal, not illustrated, and performs data communication conforming to the USB standard with the peripheral device, under the control of the control unit 10. As the peripheral device, the image transmitting device 2 is coupled to the USB communication unit 15 in this embodiment.

The image transmission program Pt stored in the storage unit 11 of the computer 1 is a program for transmitting image information from the image transmitting device 2 in order to cause the projector 4 to display the same image as the display image Im1 displayed on the display unit 13. When an instruction to execute the image transmission program Pt is given by the user or when the coupling of the image transmitting device 2 to the USB communication unit 15 is detected, the control unit 10 starts the image transmission program Pt and starts operating according to the image transmission program Pt. Specifically, the control unit 10 acquires image information of the display image Im1 displayed on the display unit 13 from the display control unit 14 and encodes the image information into a predetermined format. The control unit 10 then outputs the encoded image information from the USB communication unit 15 to the image transmitting device 2.

The image transmitting device 2 includes a control unit 20, a storage unit 21, a notification unit 22, a USB communication unit 23 as a coupling unit, and a wireless communication unit 24 as a first wireless communication unit. The image transmitting device 2 wirelessly transmits image information to an external device that is paired therewith in advance. In this embodiment, acquiring necessary information for connecting to a communication target external device via a wireless LAN is referred to as pairing. The image transmitting device 2 in this embodiment is paired with the image receiving device 3 in advance.

The control unit 20 has one or a plurality of processors The control unit 20 operates according to a control program, not illustrated, that is stored in the storage unit 21, and thus controls operations of the image transmitting device 2.

The storage unit 21 has a memory and stores a control program and control data or the like for controlling operations of the image transmitting device 2. In the storage unit 21 in this embodiment, connection information Dc for connecting to the image receiving device 3 via a wireless LAN is stored. The connection information Dc includes an SSID (Service Set Identifier), which is an identifier in the wireless LAN, a password corresponding to the SSID, the IP address of the image receiving device 3, and the like. The connection information Dc is acquired from the image receiving device 3 based on the pairing with the image receiving device 3 and is stored in the storage unit 21.

The notification unit 22 has one or a plurality of LEDs (light-emitting diodes). The control unit 20 controls the lighting state or the lighting color of the LED and thus causes the notification unit 22 to notify the user of the operation state of the image transmitting device 2.

The USB communication unit 23 is coupled to the computer 1, which is an external host device, via a USB terminal, not illustrated, and under the control of the control unit 20, performs data communication conforming to the USB standard with the computer 1.

The wireless communication unit 24 has a wireless LAN device communicating via a wireless LAN, and under the control of the control unit 20, wirelessly communicates with an external device such as the image receiving device 3. The wireless communication unit 24 in this embodiment wirelessly transmits image information inputted from the computer 1 via the USB communication unit 23, to the image receiving device 3.

The image transmitting device 2 is configured in such a way that the computer 1 can access the storage unit 21 of the image transmitting device 2 in the state where the image transmitting device 2 is coupled to the computer 1. An image transmission program Pt is stored in the storage unit 21. Therefore, even when the image transmitting device 2 is coupled to the computer 1 having no image transmission program Pt installed therein, the computer 1 can read out the image transmission program Pt from the storage unit 21 and execute the image transmission program Pt.

Figure 3:
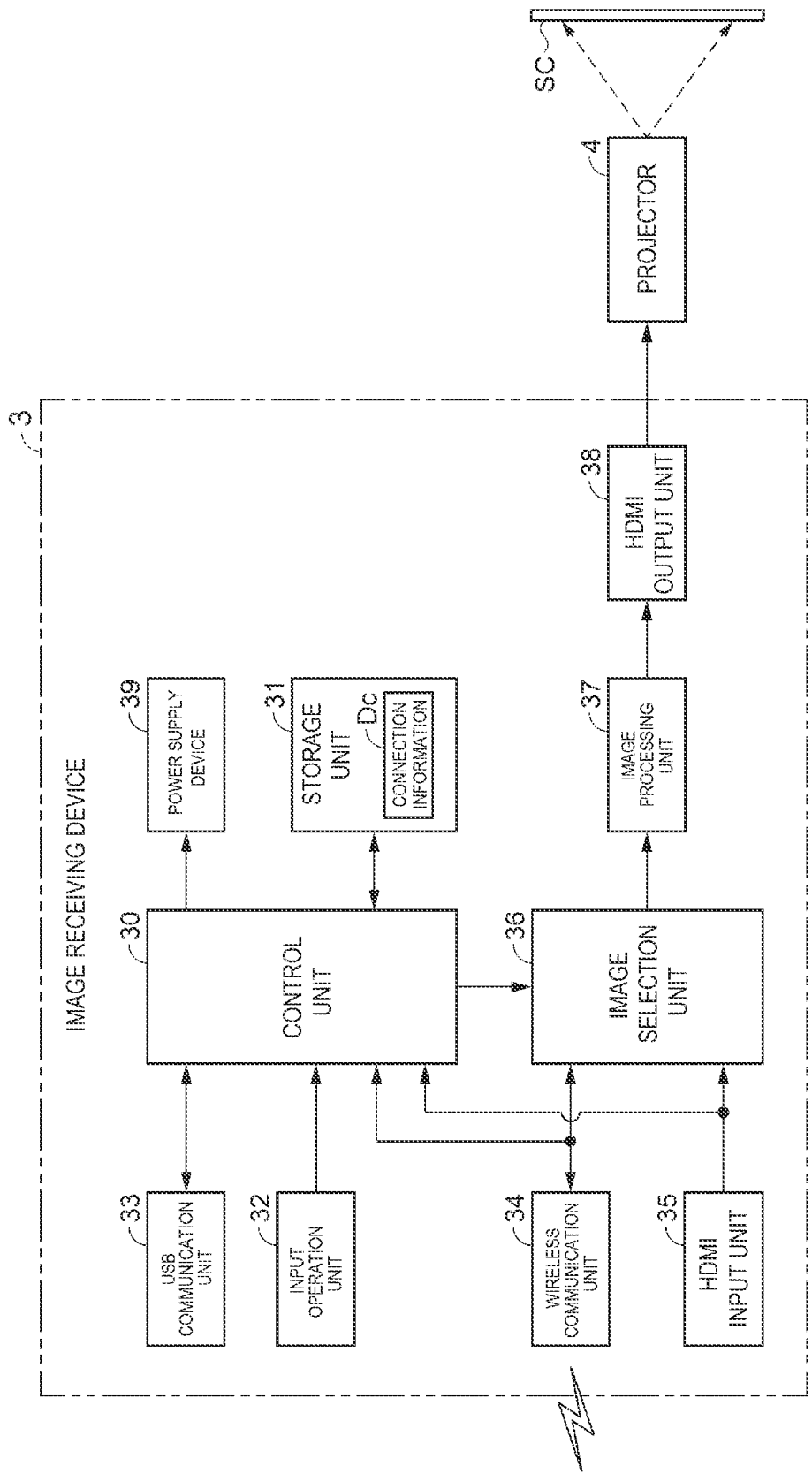
FIG. 3 is a block diagram showing a schematic configuration of an image receiving device.

FIG. 3 is a block diagram showing a schematic configuration of the image receiving device 3.

As shown in FIG. 3, the image receiving device 3 includes a control unit 30, a storage unit 31, an input operation unit 32, a USB communication unit 33, a wireless communication unit 34 as a second wireless communication unit, an HDMI (High-Definition Multimedia Interface, trademark registered) input unit 35, an image selection unit 36, an image processing unit 37, an HDMI output unit 38 as a first output unit and a second output unit, and a power supply device 39.

The control unit 30 has one or a plurality of processors. The control unit 30 operates according to a control program, not illustrated, that is stored in the storage unit 31, and thus controls operations of the image receiving device 3.

The storage unit 31 has a memory and stores a control program and control data or the like for controlling operations of the image receiving device 3. In the storage unit 31 in this embodiment, connection information Dc for an external device to connect to the image receiving device 3 via a wireless LAN is stored. The connection information Dc stored in the storage unit 21 of the image transmitting device 2 is the same as the connection information Dc stored in the storage unit 31 and is copied from the image receiving device 3 to the image transmitting device 2 when these devices are paired.

The input operation unit 32 has a plurality of operation keys for the user to give various instructions to the image receiving device 3. The operation keys provided in the input operation unit 32 include a power key for switching the power on and off, an image selection key for switching image information to be outputted, and the like. When the user operates various operation keys of the input operation unit 32, the input operation unit 32 outputs an operation signal corresponding to the content of the operation by the user to the control unit 30. A remote controller, not illustrated, that can perform remote operations, may be used as the input operation unit 32. In this case, the remote controller outputs an infrared operation signal corresponding to the content of the operation by the user, and a remote control signal receiving unit, not illustrated, receives this operation signal and transmits the operation signal to the control unit 30.

The USB communication unit 33 is coupled to an external peripheral device via a USB terminal, not illustrated, and performs data communication conforming to the USB standard with the peripheral device, under the control of the control unit 30. The USB communication unit 33 is used when the image receiving device 3 is paired with the image transmitting device 2. Specifically, when the USB communication unit 23 of the image transmitting device 2 to be paired is coupled to the USB communication unit 33 of the image receiving device 3 and a predetermined operation is carried out on the input operation unit 32, the control unit 30 outputs the connection information Dc stored in the storage unit 31 to the image transmitting device 2 via the USB communication unit 33. Then, the control unit 20 of the image transmitting device 2 stores the connection information Dc inputted via the USB communication unit 23 into the storage unit 21. The pairing is thus completed.

The wireless communication unit 34 has a wireless LAN device communicating via a wireless LAN, and under the control of the control unit 30, wirelessly communicates with an external device such as the image transmitting device 2. The control unit 30 can detect the state of the wireless communication by the image transmitting device 2, based on the result of the communication by the wireless communication unit 34. When wireless communication is started or disconnected, the control unit 30 can detect this. When image information is transmitted to the wireless communication unit 34 from the image transmitting device 2, the wireless communication unit 34 receives the image information and outputs the received image information to the image selection unit 36. The wireless communication unit 34 can also communicate with a plurality of image transmitting devices 2 and can receive image information from each of the plurality of image transmitting devices 2.

The HDMI input unit 35 is coupled to an external image output device, not illustrated, and takes in image information conforming to HDMI inputted from the image output device. The HDMI input unit 35 includes a coupling terminal and an interface circuit or the like and outputs image information inputted from the image output device, to the image selection unit 36. The control unit 30 can detect whether image information is inputted to the HDMI input unit 35 or not.

The image selection unit 36, under the control of the control unit 30, selects one or a plurality of pieces of image information inputted from the wireless communication unit 34 and the HDMI input unit 35 and outputs the selected image information to the image processing unit 37. The image selection unit 36 may be implemented by an individual circuit or may be integrated with the control unit 30.

The image processing unit 37 performs necessary processing on image information inputted from the image selection unit 36 and outputs the processed image information to the HDMI output unit 33. For example, when image information transmitted from the image transmitting device 2 is inputted to the image processing unit 37 from the image selection unit 36, the image processing unit 37 decodes the image information and performs processing to convert the image information into image information conforming to HDMI. When a plurality of pieces of image information are inputted to the image processing unit 37 from the image selection unit 36, the image processing unit 37 performs processing to reduce each piece of image information and generate one piece of image information where a plurality of images are arranged next to each other. The image processing unit 37 may also perform processing to superimpose an OSD (on-screen display) on image information, when necessary.

The HDMI output unit 33 includes a coupling terminal and an interface circuit or the like, not illustrated, and outputs image information inputted from the image processing unit 37 to an image display device coupled to the coupling terminal. The projector 4 is coupled to the HDMI output unit 38 in this embodiment. The projector 4 projects image light based on image information inputted from the image receiving device 3 and displays a display image Im2 onto the projection surface SC. The display image Im2 includes the display image Im1 displayed on the display unit 13 of the computer 1. The HDMI output unit 38 also relays input and output of control information, based on a function called CEC (Consumer Electronics Control) of HDMI. Therefore, the control unit 30 can input and output control information to and from the projector 4 via the HDMI output unit 38. The control information includes a control signal for controlling the power of the projector 4.

The power supply device 39 is coupled to a power grid, not illustrated, of AC 100 V or the like. The power supply device 39 converts electric power from the power grid to DC power of a predetermined voltage, and under the control of the control unit 30, supplies the electric power to each part forming the image receiving device 3. The supply route of electric power is not illustrated. In the state where the power supply device 39 is coupled to the power grid, the image receiving device 3 can switch between a power-on state as a first state and a standby state as a second state. The power-on state is a state where the power of the image receiving device 3 is on and where electric power is supplied from the power supply device 39 to each part of the image receiving device 3, enabling the image receiving device 3 to perform a desired operation. Meanwhile, the standby state is a state where the power is off except for a portion of the image receiving device 3 and where power consumption is lower than in the power-on state. In the standby state in this embodiment, electric power is supplied from the power supply device 39 to the input operation unit 32, the wireless communication unit 34, and a part of the control unit 30 controlling these units, and therefore enables these units to operate. The control unit 30 can control the power supply device 39 to switch between the power-on state and the standby state.

Operations of the image transmission system 100 will now be described.

As described above, the image transmitting device 2 is paired with the image receiving device 3 in advance, and the connection information Dc for wirelessly connecting to the image receiving device 3 is stored in the storage unit 21 of the image transmitting device 2. The connection information Dc is acquired by the user coupling the USB communication unit 23 of the image transmitting device 2 to the USB communication unit 33 of the image receiving device 3. However, when the communication target is decided in advance, the connection information Dc maybe stored in the storage unit 21 before product shipping.

When the user couples the USB communication unit 23 of the image transmitting device 2 that is already paired, to the USB communication unit 15 of the computer 1, the image transmitting device 2 receives supply of electric power from the computer 1 via the USB communication unit 23 and starts operating according to the control program stored in the storage unit 21.

First, the image transmitting device 2 starts wireless communication by the wireless communication unit 24 and requests the image receiving device 3 to connect, based on the connection information Dc stored in the storage unit 21. The image receiving device 3 receives the request for connection from the image transmitting device 2 and transmits a response to permit connection. Connection between the image transmitting device 2 and the image receiving device 3 via a wireless LAN is thus established.

Meanwhile, when detecting the coupling of the image transmitting device 2 to the USB communication unit 15, the control unit 10 of the computer 1 starts the image transmission program Pt that is installed in advance, and starts operating according to the image transmission program Pt. Specifically, the control unit 10 outputs image information of the display image Im1 displayed on the display unit 13 of the computer 1 to the image transmitting device 2 from the USB communication unit 15. The image transmitting device 2 receives supply of the image information via the USB communication unit 23 and starts transmitting the image information from the wireless communication unit 24.

As described above, when the image transmission program Pt is not installed in advance in the computer 1 to which the image transmitting device 2. is coupled, the user can designate, via the input operation unit 12, the image transmission program Pt stored in the storage unit 21 of the image transmitting device 2 and cause the computer 1 to execute the image transmission program Pt.

Figure 4:
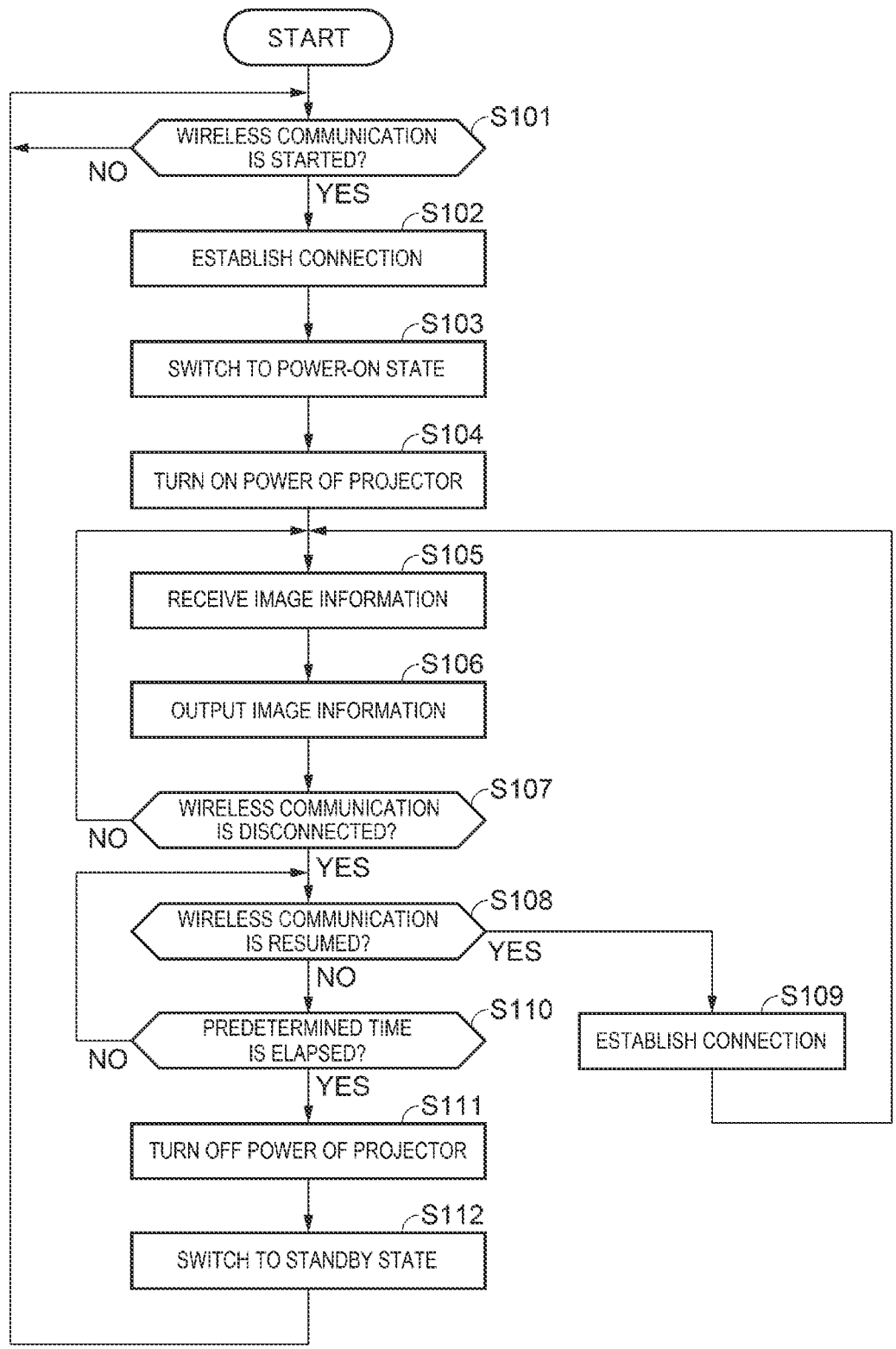
FIG. 4 is a flowchart for explaining an operation of the image receiving device.

FIG. 4 is a flowchart for explaining operations of the image receiving device 3, that is, a control method for the image receiving device 3. In the standby state, the image receiving device 3 operates according to the flow shown in FIG. 4. To simplify the explanation, FIG. 4 shows a configuration where the image receiving device 3 receives image information only from one image transmitting device 2.

As shown in FIG. 4, in step S101, the control unit 30 of the image receiving device 3 determines whether wireless communication by the image transmitting device 2 is started or not, that is, whether a request for connection is made by the image transmitting device 2 or not. When a request for connection is made by the image transmitting device 2, the control unit 30 shifts to step S102 and establishes connection via a wireless LAN. Meanwhile, when no request for connection is made by the image transmitting device 2, the control unit 30 repeats step S101.

As the wireless communication by the image transmitting device 2 is started and the connection with the image transmitting device 2 is established, the control unit 30 in step S103 controls the power supply device 39 to start supplying electric power to each part and switches the power state of the image receiving device 3 from the standby state to the power-on state.

Next, in step S104, the control unit 30 outputs a first control signal, which is a control signal for turning on the power of the projector 4, from the HDMI output unit 38 to the projector 4 by the CEC function of HDMI. When the first control signal is inputted to the projector 4 in the standby state, the projector 4 turns on its own power and is thus enabled to project an image.

In step S105, the wireless communication unit 34 receives image information transmitted from the image transmitting device 2. The received image information is outputted to the image processing unit 37 via the image selection unit 36. In step S106, the image processing unit 37 performs necessary processing such as decoding on the inputted image information and outputs the processed image information to the projector 4 via the HDMI output unit 38.

In step S107, the control unit 30 determines whether the wireless communication from the image transmitting device 2 is disconnected or not. For example, when the image transmitting device 2 is removed from the computer 1 and the computer 1 and the image transmitting device 2 are decoupled from each other, the wireless communication is disconnected. When detecting that the wireless communication is disconnected, the control unit 30 performs processing to end the communication and then shifts the processing to step S108. Meanwhile, when not detecting that the wireless communication is disconnected, the control unit 30 returns the processing to step S105 and repeats the reception and output of image information.

When the wireless communication by the image transmitting device 2 is disconnected and the processing is shifted to step S108, the control unit 30 determines whether the wireless communication by the image transmitting device 2 is resumed or not, that is, whether a request for connection is made again by the image transmitting device 2 or not. For example, when the image transmitting device 2 removed from the computer 1 is coupled to another computer 1, the wireless communication by the image transmitting device 2 is resumed. When a request for connection is made by the image transmitting device 2, the control unit 30 shifts the processing to step S109. When no request for connection is made by the image transmitting device 2, the control unit 30 shifts the processing to step S110.

When a request for connection is made by the image transmitting device 2 and the processing is shifted to step S109, the control unit 30 establishes connection with the image transmitting device 2 via a wireless LAN again and shifts the processing to step S105. From this point onward, the image receiving device 3 repeats the reception and output of image information transmitted from the image transmitting device 2.

Meanwhile, when no request for connection is made by the image transmitting device 2 and the processing is shifted to step S110, the control unit 30 determines whether a predetermined time is elapsed since the disconnection of the wireless communication is detected in step S107, or not. When the predetermined time is not elapsed, the control unit 30 returns the processing to step S108 and determines whether the wireless communication is resumed or not. Meanwhile, when the predetermined time is elapsed since the disconnection of the wireless communication is detected, the control unit 30 shifts the processing to step S111. The predetermined time is assumed to be, for example, approximately one minute. However, the predetermined time may be shorter than one minute or may be a longer time than one minute such as five minutes or ten minutes.

When the predetermined time is elapsed since the disconnection of the wireless communication is detected, and the processing is shifted to step S111, the control unit 30 outputs a second control signal, which is a control signal for turning off the power of the projector 4, from the HDMI output unit 38 to the projector 4 by the CEC function of HDMI. When the second control signal is inputted to the projector 4 in the power-on state, the projector 4 turns off its own power and turns into the standby state of waiting for the input of the first control signal.

In step S112, the control unit 30 controls the power supply device 39 to partly stop the supply of electric power and switches the power state of the image receiving device 3 from the power-on state to the standby state. Subsequently, the control unit 30 shifts the processing to step S101 and waits for the wireless communication by the image transmitting device 2 to start.

As described above, according to this embodiment, the image transmitting device 2 starts wireless communication when coupled to the computer 1. The image receiving device 3 turns on the power of the projector 4 when the wireless communication is started. That is, when the image transmitting device 2 is coupled to the computer 1, the power of the projector 4 is turned on. Therefore, the user no longer needs to move to the position of the projector 4 or the remote controller in order to turn on the power of the projector 4. This improves the convenience of the user.

According to this embodiment, the image receiving device 3 turns off the power of the projector 4 when the wireless communication by the image transmitting device 2 is disconnected Therefore, the user no longer needs to move to the position of the projector 4 or the remote controller in order to turn off the power of the projector 4. This further improves the convenience of the user.

According to this embodiment, when the image transmitting device 2 is coupled to the computer 1, the power of the image receiving device 3 turns on, too. This further improves the convenience of the user.

According to this embodiment, when the wireless communication by the image transmitting device 2 is disconnected, the power of the image receiving device 3 turns off, too. This further improves the convenience of the user.

According to this embodiment, the power of the projector 4 is turned off after a predetermined time is elapsed since the wireless communication by the image transmitting device 2 is disconnected. Therefore, the power of the projector 4 can be restrained from being turned off when the wireless communication is temporarily disconnected, for example, when the image transmitting device 2 is coupled to another computer 1 or the like.

According to this embodiment, the output of a control signal for controlling the power of the projector 4 and the output of image information to the projector 4 are carried out via the same HDMI output unit 38. Therefore, the configuration of the image transmission system 100 can be simplified.

In a configuration where the image receiving device 3 wirelessly communicates with a plurality of image transmitting devices 2 and receives image information from each image transmitting device 2, the control unit 30 outputs the second control signal to the projector 4 and switches the image receiving device 3 into the standby state, after a predetermined time is elapsed since the image transmitting devices 2 are removed one after another from the computer 1 and the wireless communication with the last remaining image transmitting device 2 is disconnected. When image information is inputted to the HDMI input unit 35, the control unit 30 maintains both the image receiving device 3 and the projector 4 in the power-on state even after the wireless communication with all the image transmitting devices 2 is disconnected.

The image information received by the image receiving device 3 from the image transmitting device 2 is encoded image information, whereas the image information outputted by the image receiving device 3 to the projector 4 is decoded image information. That is, these two are of different formats. However, the two can be regarded as the same image information because both are image information representing the same display image Im1.

Second Embodiment

Figure 5:
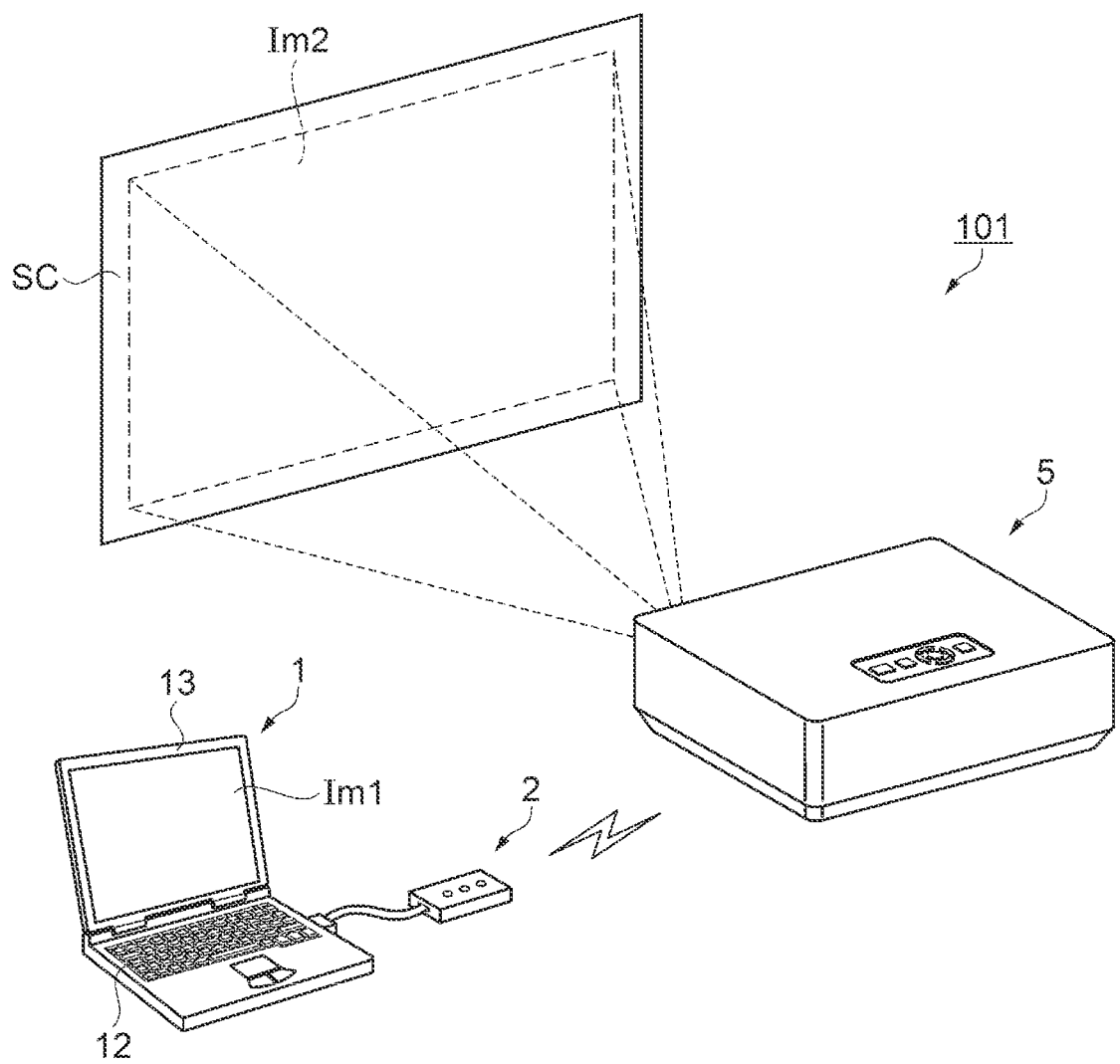
FIG. 5 is an explanatory view showing an image display system according to a second embodiment.

FIG. 5 is an explanatory view showing an image transmission system 101 according to a second embodiment.

As shown in FIG. 5, the image transmission system 101 according to this embodiment has a computer 1 as an image supply device, an image transmitting device 2, and a projector 5 as an image display device. The projector 5 in this embodiment is a device formed of the image receiving device 3 and the projector 4 in the first embodiment integrated together. In this embodiment, the image transmitting device 2 and the projector 5 are connected together via a wireless LAN.

Figure 6:
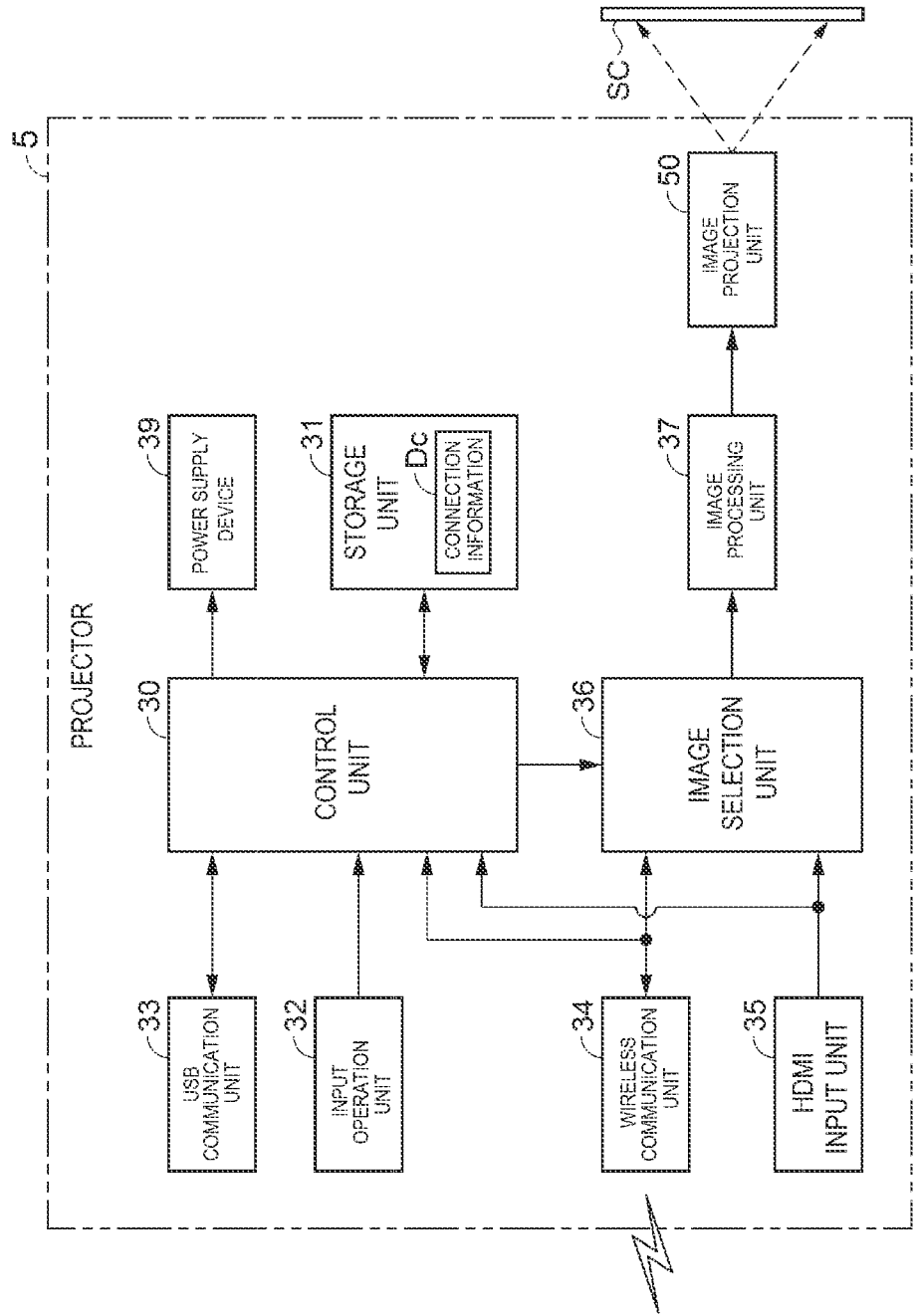
FIG. 6 is a block diagram showing a schematic configuration of a projector according to the second embodiment.
Figure 7:
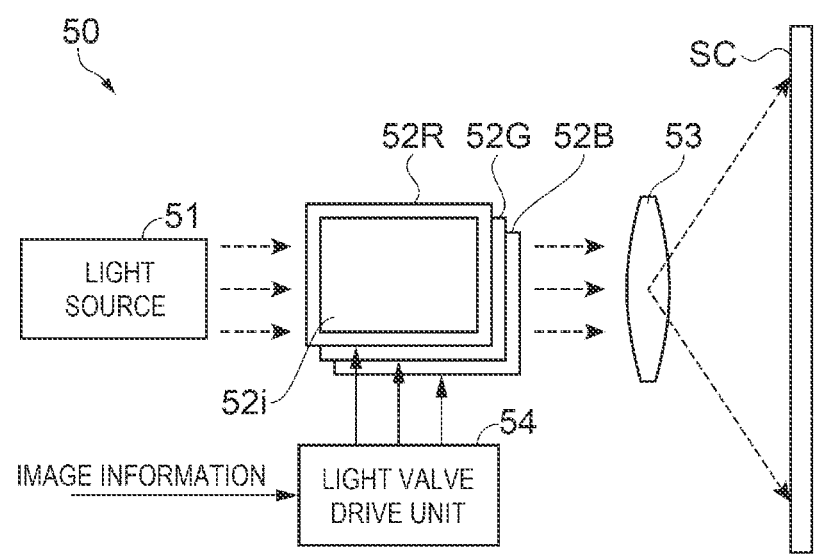
FIG. 7 is a block diagram showing a schematic configuration of an image projection unit.

FIG. 6 is a block diagram showing a schematic configuration of the projector 5. FIG. 7 is a block diagram showing a schematic configuration of an image projection unit 50 provided in the projector 5.

As shown in FIG. 6, the projector 5 differs from the image receiving device 3 in having the image projection unit 50 instead of the HDMI output unit 38 of the image receiving device 3 in the first embodiment but is the same as the image receiving device 3 in terms of the other components. Therefore, in the description below, the same components as in the image receiving device 3 are denoted by the reference signs used in the description of the first embodiment, and detailed description of each of these components is omitted.

The image processing unit 37 in this embodiment performs necessary processing such as decoding on image information inputted from the image selection unit 36, converts the processed image information into a format suitable for the use in the image projection unit 50, and outputs the converted image information to the image projection unit 50.

As shown in FIG. 7, the image projection unit 50 has a light source 51, three liquid crystal light valves 52R, 52G, 52B as light modulation devices, a projection lens 53 as a projection system, and a light valve drive unit 54 or the like. The image projection unit 50 is equivalent to a display unit. The image projection unit 50 modulates light emitted from the light source 51 by the liquid crystal light valves 52R, 52G, 52B so as to form image light, then projects the image light from the projection lens 53, and thus displays an image on the projection surface SC.

The light source 51 includes a discharge-type light source lamp such as an ultra-high-pressure mercury lamp or metal halide lamp, or a solid-state light source such as a light-emitting diode or semiconductor laser. The light emitted from the light source 51 is converted into light with substantially uniform luminance distribution by an optical integration system, not illustrated, and then separated into color light components of red, green, and blue, which are the primary colors of light, by a color separation system, not illustrated. Subsequently, the color light components become incident on the corresponding liquid crystal light valves 52R, 52G, 52B.

Each of the liquid crystal light valves 52R, 52G, 52B is formed of a transmission-type liquid crystal panel, not illustrated, that is made up of a pair of transparent substrates with a liquid crystal enclosed between the substrates, or the like. In each liquid crystal panel, a rectangular image forming area 52i made up of a plurality of pixels arrayed in a matrix is formed, thus enabling application of a drive voltage to the liquid crystal at each pixel.

The light valve drive unit 54 forms an image in the image forming area 52i of the liquid crystal light valves 52R, 52G, 52B. Specifically, the light valve drive unit 54 applies a drive voltage corresponding to image information inputted from the image processing unit 37, to each pixel in the image forming area 52i, and thus sets each pixel to a light transmittance corresponding to the image information. The light emitted from the light source 51 is transmitted through the image forming area 52i of the liquid crystal light valves 52R, 52G, 52B and is thus modulated at each pixel, forming image light corresponding to the image information for each color light component. The resulting image light of the respective colors is combined for each pixel together into image light representing a color image by a light combining system, not illustrated, and is projected in an enlarged form onto the projection surface SC by the projection lens 53. Thus, an image based on the image information transmitted from the image transmitting device 2, that is, the display image Im2 including the display image Im1 displayed on the display unit 13 of the computer, is displayed on the projection surface SC, as shown in FIG. 5.

Operations of the image transmission system 101 will now be described.

The image transmitting device 2 is paired with the projector 5 in advance, and the connection information Dc for wirelessly connecting to the projector 5 is stored in the storage unit 21 of the image transmitting device 2. The connection information Dc is acquired by the user coupling the USB communication unit 23 of the image transmitting device 2 to the USB communication unit 33 of the projector 5. However, when the communication target is decided in advance, the connection information Dc maybe stored in the storage unit 21 before product shipping.

When the user couples the USB communication unit 23 of the image transmitting device 2 that is already paired, to the USB communication unit 15 of the computer 1, the image transmitting device 2 receives supply of electric power from the computer 1 via the USB communication unit 23 and starts operating according to the control program stored in the storage unit 21.

First, the image transmitting device 2 starts wireless communication by the wireless communication unit 24 and requests the projector 5 to connect, based on the connection information Dc stored in the storage unit 21. The projector 5 receives the request for connection from the image transmitting device 2 and transmits a response to permit connection. Connection between the image transmitting device 2 and the projector 5 via a wireless LAN is thus established.

Meanwhile, when detecting the coupling of the image transmitting device 2 to the USB communication unit 15, the control unit 10 of the computer 1 starts the image transmission program Pt that is installed in advance, and starts operating according to the image transmission program Pt. Specifically, the control unit 10 outputs image information of the display image Im1 displayed on the display unit 13 of the computer 1 to the image transmitting device 2 from the USB communication unit 15. The image transmitting device 2 receives supply of the image information via the USB communication unit 23 and starts transmitting the image information from the wireless communication unit 24.

FIG. 8 is a flowchart for explaining operations of the projector 5, that is, a control method for the projector 5. In the standby state, the projector 5 operates according to the flow shown in FIG. 8. To simplify the explanation, FIG. 8 shows a configuration where the projector 5 receives image information only from one image transmitting device 2.

As shown in FIG. 8, in step S201, the control unit 30 of the projector 5 determines whether wireless communication by the image transmitting device 2 is started or not, that is, whether a request for connection is made by the image transmitting device 2 or not. When a request for connection is made by the image transmitting device 2, the control unit 30 shifts to step S202 and establishes connection via a wireless LAN. Meanwhile, when no request for connection is made by the image transmitting device 2, the control unit 30 repeats step S201.

As the wireless communication by the image transmitting device 2 is started and the connection with the image transmitting device 2 is established, the control unit 30 in step S203 controls the power supply device 39 to start supplying electric power to each part and switches the power state of the projector 5 from the standby state to the power-on state.

In step S204, the wireless communication unit 34 receives image information transmitted from the image transmitting device 2. The received image information is outputted to the image processing unit 37 via the image selection unit 36. In step S205, the image processing unit 37 performs necessary processing such as decoding on the inputted image information, outputs the processed image information to the image projection unit 50, and thus causes the image projection unit 50 to display an image.

In step S206, the control unit 30 determines whether the wireless communication from the image transmitting device 2 is disconnected or not. When detecting that the wireless communication is disconnected, the control unit 30 performs processing to end the communication and then shifts the processing to step S207. Meanwhile, when not detecting that the wireless communication is disconnected, the control unit 30 returns the processing to step S204 and repeats the reception and output of image information.

When the wireless communication by the image transmitting device 2 is disconnected and the processing is shifted to step S207, the control unit 30 determines whether the wireless communication by the image transmitting device 2 is resumed or not, that is, whether a request for connection is made again by the image transmitting device 2 or not. When a request for connection is made by the image transmitting device 2, the control unit 30 shifts the processing to step S208. When no request for connection is made by the image transmitting device 2, the control unit 30 shifts the processing to step S209.

When a request for connection is made by the image transmitting device 2 and the processing is shifted to step S208, the control unit 30 establishes connection with the image transmitting device 2 via a wireless LAN again and shifts the processing to step S204. From this point onward, the projector 5 repeats the reception of image information transmitted from the image transmitting device 2 and the display of an image.

Meanwhile, when no request for connection is made by the image transmitting device 2 and the processing is shifted to step S209, the control unit 30 determines whether a predetermined time is elapsed since the disconnection of the wireless communication is detected in step S206, or not. When the predetermined time is not elapsed, the control unit 30 returns the processing to step S207 and determines whether the wireless communication is resumed or not. Meanwhile, when the predetermined time is elapsed since the disconnection of the wireless communication is detected, the control unit 30 shifts the processing to step S210.

When the predetermined time is elapsed since the disconnection of the wireless communication is detected, and the processing is shifted to step S210, the control unit 30 controls the power supply device 39 to partly stop the supply of electric power and switches the power state of the projector 5 from the power-on state to the standby state. Subsequently, the control unit 30 shifts the processing to step S201 and waits for the wireless communication by the image transmitting device 2 to start.

As described above, according to this embodiment, the image transmitting device 2 starts wireless communication when coupled to the computer 1. The projector 5 turns on its own power when the wireless communication is started. That is, when the image transmitting device 2 is coupled to the computer 1, the power of the projector 5 is turned on. Therefore, the user no longer needs to move to the position of the projector 5 or the remote controller in order to turn on the power of the projector 5. This improves the convenience of the user.

According to this embodiment, the projector 5 turns off its own power when the wireless communication by the image transmitting device 2 is disconnected. Therefore, the user no longer needs to move to the position of the projector 5 or the remote controller in order to turn off the power of the projector 5. This further improves the convenience of the user.

The embodiments may be changed as follows.

In the first and second embodiments, the computer 1 is employed as an image supply device. However, the image supply device is not limited to the computer 1 and may be any other device to which the image transmitting device 2 can be coupled, for example, a smartphone or tablet terminal.

In the first and second embodiments, the coupling between the computer 1 and the image transmitting device 2 is in conformity with the USB standard. However, this coupling may be in conformity with other standards. It is desired that the computer 1 and the image transmitting device 2 are coupled together via a wire such as USB. The wired coupling enables visual checking of the coupling between the computer 1 and the image transmitting device 2, that is, the coupling that triggers switching of the power state of the image receiving device 3 or the projectors 4, 5. Thus, wrong coupling can be prevented.

Although a configuration where the image transmitting device 2 and the image receiving device 3 or the projector 5 communicate with each other via a wireless LAN is described, the communication may be in conformity with other standards, provided that wireless communication is employed.

In the first embodiment, the coupling between the image receiving device 3 and the projector 4 is in conformity with the HDMI standard. However, the coupling may be in conformity with other standards.

In the second embodiment, the transmission-type liquid crystal light valves 52R, 52G, 52B are used as light modulation devices. However, a reflection-type light modulation device such as a reflection-type liquid crystal light valve can be used. Also, a digital micromirror device which controls the direction of exit of incident light for each micromirror as a pixel and thus modulates the light emitted from the light source 51 can be used. The configuration having a plurality of light modulation devices corresponding to color lights is not limiting. A configuration where a single light modulation device modulates a plurality of color lights in time division may be employed.

In the first and second embodiments, the projectors 4, 5 are employed as an image display device. However, the image display device is not limited to the projectors 4, 5 and may be other image display devices such as a liquid crystal display or organic EL display. In such cases, a display screen formed by a liquid crystal panel, organic EL panel or the like is equivalent to a display unit.

In the first embodiment, the image receiving device 3 performs both the output of image information to the projector 4 and the output of a control signal for controlling the power of the projector 4, via the same HDMI output unit 38. However, the image receiving device 3 may perform the output of image information and the output of a control signal via different interfaces.

What is claimed is:

1. An image transmission system comprising:
   an image transmitting device coupled to an image supply device, and
   an image receiving device coupled to an image display device, the image transmission system being configured to transmit image information from the image transmitting device to the image receiving device via wireless communication,
   the image transmitting device comprising:
      a first wireless communication unit starting the wireless communication when the image transmitting device is coupled to the image supply device, and transmitting the image information supplied from the image supply device to the image receiving device,
   the image receiving device comprising:
      a second wireless communication unit receiving the image information transmitted from the image transmitting device;
      a first output unit outputting the image information received by the second wireless communication unit to the image display device;
      a second output unit outputting a control signal controlling a power of the image display device to the image display device; and
      a control unit detecting a state of the wireless communication by the image transmitting device, the control unit is configured to input and output control information to and from the image display device via the first output unit and the second output unit, wherein the control information includes controlling the power of the image display device, and wherein
   the control unit outputs a first control signal from the second output unit directly to the image display device for the image display device to turn on its own power, when detecting that the wireless communication requesting to transmit image information is started, and
   the control unit outputs a second control signal turning off the power of the image display device from the second output unit to the image display device, when detecting that the wireless communication is disconnected.

2. The image transmission system according to claim 1, wherein
   the image receiving device is configured to switch between a first state where the power is on and a second state where the power is off except for a portion including the second wireless communication unit, and
   the control unit switches the image receiving device into the first state when detecting that the wireless communication is started where the image receiving device is in the second state.

3. The image transmission system according to claim 2, wherein
   the control unit switches the image receiving device into the second state when detecting that the wireless communication is disconnected where the image receiving device is in the first state.

4. The image transmission system according to claim 1, wherein
   the control unit outputs the second control signal from the second output unit after a predetermined time is elapsed since it is detected that the wireless communication is disconnected.

5. The image transmission system according to claim 1, wherein
   the second output unit is the same as the first output unit.

6. The image transmission system according to claim 1, wherein
   the image transmitting device is coupled to the image supply device via a wire.

7. An image receiving device which receives image information from an image transmitting device starting wireless communication when coupled to an image supply device and which outputs the image information to an image display device, the image receiving device comprising:
   a wireless communication unit receiving the image information transmitted from the image transmitting device;
   a first output unit outputting the image information received by the wireless communication unit to the image display device;
   a second output unit outputting a control signal controlling a power of the image display device to the image display device; and
   a control unit detecting a state of the wireless communication by the image transmitting device, the control unit is configured to input and output control information to and from the image display device via the first output unit and the second output unit, wherein the control information includes controlling the power of the image display device, and wherein
   the control unit outputs a first control signal from the second output unit directly to the image display device for the image display device to turn on its own power, when detecting that the wireless communication requesting to transmit image information is started, and
   the control unit outputs a second control signal turning off the power of the image display device from the second output unit to the image display device, when detecting that the wireless communication is disconnected.

8. A control method for an image receiving device which receives image information from an image transmitting device starting wireless communication when coupled to an image supply device and which outputs the image information to an image display device, the control method comprising:
   outputting the image information received by a wireless communication unit to the image display device by a first output unit of the image receiving device;
   outputting a signal controlling a power of the image display device to the image display device by a second output unit of the image receiving device;
   detecting a state of the wireless communication by the image transmitting device;
   outputting a first control signal from the second output unit directly to the image display device for the image display device to turn on its own power, when detecting that the wireless communication requesting to transmit image information is started;
   receiving the image information transmitted from the image transmitting device;
   outputting the received image information to the image display device; and
   outputting a second control signal from the second output unit to the image display device turning off the power of the image display device, when detecting that the wireless communication is disconnected.

* * * * *